United States Patent [19]

Kuchyt

[11] 3,988,954

[45] Nov. 2, 1976

[54] HEAVY DUTY SHEAR

[76] Inventor: Charles Kuchyt, R.R. No. 3, Box 118, Shelbyville, Ind. 46176

[22] Filed: Feb. 24, 1975

[21] Appl. No.: 552,434

Related U.S. Application Data

[62] Division of Ser. No. 432,528, Jan. 11, 1974.

[52] U.S. Cl. .................................. 83/525; 83/530; 83/639
[51] Int. Cl.² .......................................... B26D 5/12
[58] Field of Search ............................ 83/524–526, 83/530, 639

[56] References Cited
UNITED STATES PATENTS

| | | | |
|---|---|---|---|
| 590,041 | 9/1897 | Guild et al. | 83/639 X |
| 590,049 | 9/1897 | Roth et al. | 83/525 X |

*Primary Examiner*—J. M. Meister
*Attorney, Agent, or Firm*—Jenkins, Hanley & Coffey

[57] ABSTRACT

A shear comprising a frame, a fixed blade, a movable blade cooperating with the fixed blade to cut sheet material disposed therebetween, a hydraulic power cylinder for moving the movable blade upwardly and downwardly past the fixed blade, a lever for drivingly connecting the power cylinder to the movable blade, the lever being pivotally mounted upon the frame to provide oppositely extending lever portions, one pivotally connected to the movable blade and the other pivotally connected to the ram of the power cylinder, a roller journal mounted upon brackets to extend across the frame with the brackets selectively adjustably movable to position the roller, and springs for yieldably urging the movable blade against the roller. The power cylinder is controlled by a linkage and lever mechanism which moves the control member of a valve in response to the movement of a foot pedal as well as the movement of the lever which drivingly connects the power cylinder to the movable blade.

1 Claim, 10 Drawing Figures

HEAVY DUTY SHEAR

This is a division of application Ser. No. 432,528, filed Jan. 11, 1974.

The present invention relates to shears, and more particularly to the provision of a heavy-duty shear for cutting relatively thick sheet steel. Many inventors have proposed shears for cutting thick sheet steel, and U.S. Pat. Nos. 2,645,287; 3,074,304; 3,183,756; 3,211,037; 3,218,902; 3,242,786; 3,316,791; 3,371,569; 3,495,489; 3,524,374; 3,530,761; and 3,691,890 are representative patents showing such prior art shear mechanisms. Reference is made to these prior art patents and the patent references cited therein, U.S. Pat. No. 3,691,890 being my own patent.

Shears conventionally include a fixed knife blade and a vertically movable knife blade which cooperates with the fixed knife blade to shear material disposed therebetween. The fixed knife blade conventionally provides a horizontally extending knife edge while the movable knife blade conventionally provides an inclined knife edge which moves past the fixed knife edge.

Conventionally, the movable knife blade is supported for reciprocatory movement upwardly and downwardly by means of gibs, guides and the like. Several of the prior art patents listed above show such conventional gib or guide structures.

Since the lateral spacing or clearance between the fixed knife blade and the movable knife blade must be selectively adjusted to accommodate sheet materials of different thicknesses, some sort of mechanism, and coventionally a complicated mechanism, must be provided to shift the guides for the movable blade in order to shift the movable blade relative to the fixed blade. The Berns et al. U.S. Pat. No. 3,218,902 listed above does disclose means for adjusting the clearance between the movable blade and the fixed blade, such means including springs which urge the carrier block for the movable blade against a gib and cotter system, the gib and cotter system being mechanically adjustable by a motor to determine the position of the block or movable blade relative to the fixed blade.

The Giordano U.S. Pat. No. 3,242,786 listed above shows a structure by which the movable knife carrier block moves against a roller, the position of which is determined by adjusting a cam acting against a cam surface on the arm which supports the roller. The carrier block is spring urged against the roller by spring washers. Then, the Pearson et al. U.S. Pat. No. 3,317,569 listed above discloses a structure including adjustable rollers against which the carrier block for the movable blade is urged by means of springs.

My present invention is an improvement over such prior art shear systems because I pivotally mount my movable blade, or the block which supports the actual movable cutting blade, upon one end of a lever frame, the other end of which is pivotally connected to one or more rams of hydraulic power cylinders. In other words, my movable blade is pivotally suspended from one end of a crank or lever which supports as well as drives the blade downwardly and upwardly. In order to establish the desired clearance between the fixed blade and movable blade, I use springs to hold the movable blade support block against selectively adjustable roller means, i.e., roller means journalled about an axis which is selectively adjustably movable relative to the fixed blade cutting edge. Then, since the adjustment of the roller means against which the blade support block is urged will change the alignment of the movable blade relative to the fixed blade, my preferred pivotal connection between the movable blade and the drive lever is a connection which will permit that pivot axis to be selectively adjustably moved toward and away from the drive lever pivot axis. As will be more completely described hereinafter, I prefer to use an eccentric sleeve arrangement providing the selectively adjustable pivotal connection between the movable blade and the drive lever.

By using such a drive lever, I can obtain a very significant mechanical advantage by having the lever portion connected to the drive rams longer than the lever portion supporting the movable blade.

It is an object of my present invention, therefore, to provide such a shear wherein the improvement comprises means for guiding the movable blade means for movement past the fixed blade means, the guiding means including bracket means mounted on the shear frame for selectively adjustable movement relative to the fixed blade means, roller means journal mounted upon the bracket means for rotation about an axis generally perpendicular to the direction of movement of the movable blade means, and means for yieldably urging the movable blade means against the said roller means.

It is another object of my present invention to provide such a shear wherein the improvement comprises means for connecting the movable blade to the power cylinder ram, the connecting means including lever means mounted on the shear frame for pivotal movement about an axis generally parallel to the journal axis of the said roller means and providing oppositely extending lever portions, means for pivotally connecting the movable blade means to one of said lever portions and means for pivotally connecting the ram to the other of said lever portions.

Still another object of my present invention is to provide such a shear wherein the improvement includes a bearing block supporting the movable blade means and selectively adjustable trunnion means for pivotally mounting the bearing block on the said one lever portion such that the pivot axis provided by said bearing block is selectively adjustable relative to the pivot axis of the drive lever.

My preferred shear includes a very simple and conventional fluid valve having a movable valve control member with an extended position permitting fluid flow to extend the ram of the power cylinder to drive the movable blade means downwardly past the fixed blade means, a retracted position permitting fluid flow to retract the ram, and a neutral position between the extended and retracted positions permitting circulation of the hydraulic fluid without moving the drive ram. By using the simple and conventional control valve and a lever and linkage arrangement, I can control the movement of the movable blade very simply by operation of a foot pedal and without the usual hydraulic limit switches, switch-over valves, and the like.

Other objects and features of my present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
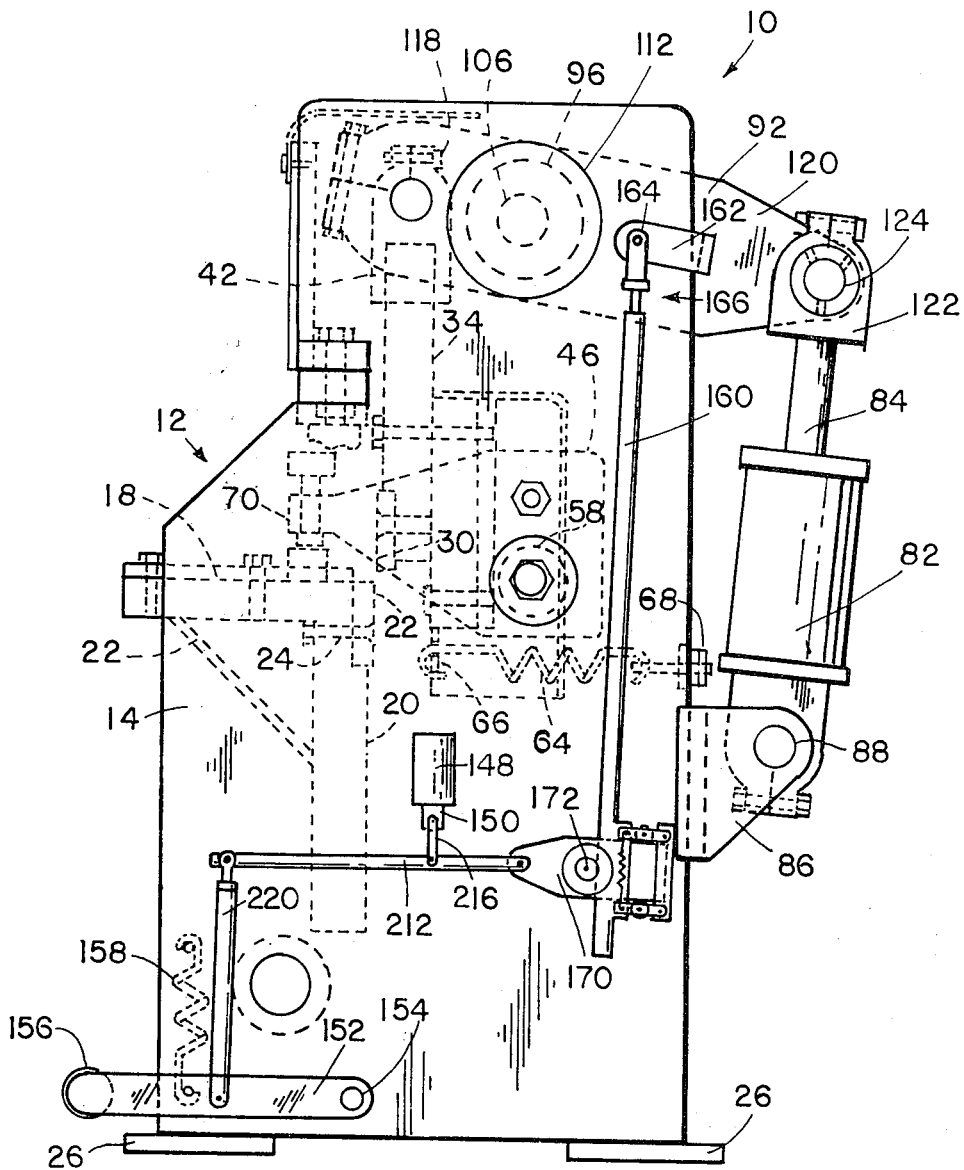
FIG. 1 is an end view of my shear.
Figure 2:
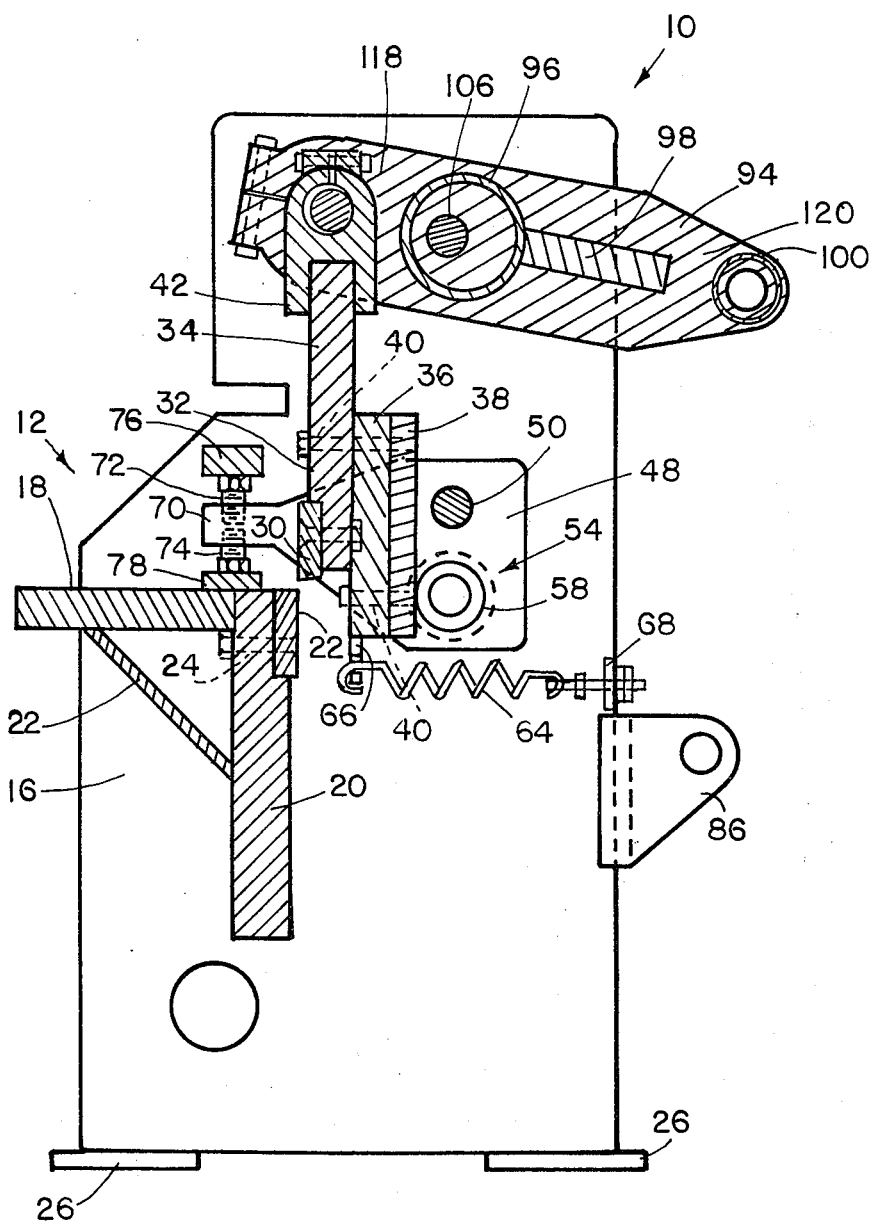
FIG. 2 is an end view with the end plate removed and showing, in section, the major components of my shear.
Figure 3:
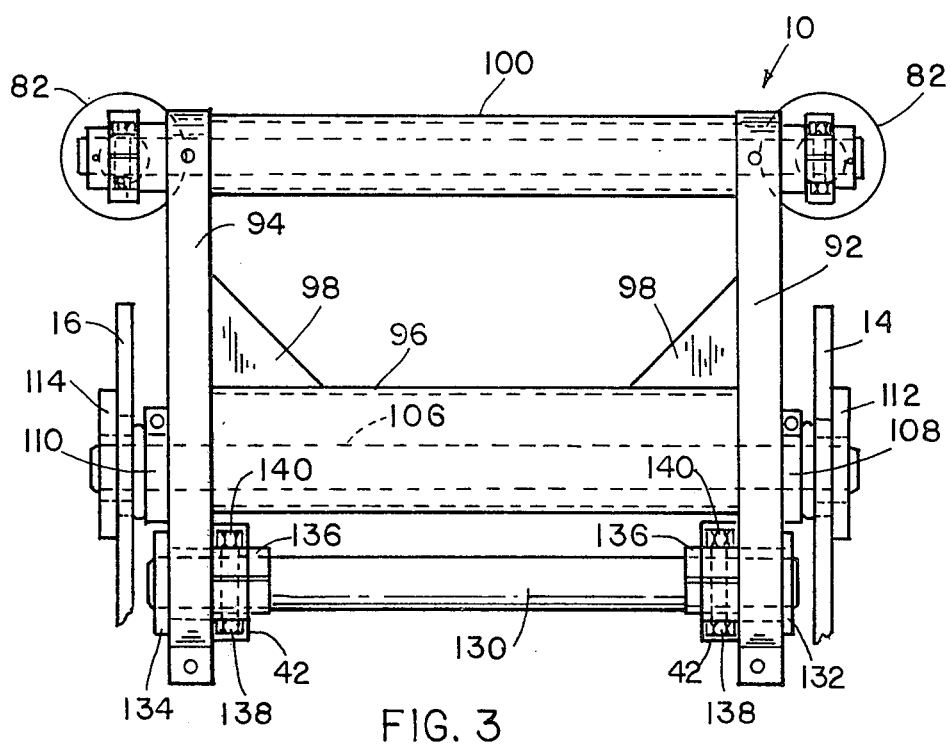
FIG. 3 is a plan view of my shear.

Referring now particularly to the drawings, it will be seen that the shear 10 comprises a frame 12 including a pair of upstanding side plates 14, 16 and a bed plate 18 extending therebetween to provide an upwardly-facing, horizontally extending work surface for receiving sheet material. As best viewed in FIG. 2, the bed plate 18 is part of a structure including a vertically extending blade support member 20 and a strengthening angle plate 22. The frame structure including the side plates 14, 16, bed plate 18, blade support member 20 and strengthening member 22 may be welded or otherwise securely fastened together to provide a structurally sound shear frame. A fixed blade 22 is mounted upon the member 20 to extend horizontally along the upper edge thereof from side plate 14 to side plate 16. This blade 22 is held securely by means such as the illustrated screws 24. The cutting edge of this blade 22 is generally flush with and defines the rearward edge of the work surface provided primarily by the bed plate 18. The shear 10 may be mounted upon foot plates 26 as illustrated.

A shear must have at least one movable blade, and my shear 10 includes a movable blade 30 which is rigidly fastened by means such as illustrated screws 32 to a blade support block 34. While it is not shown in the drawings, it will be well understood by those familiar with the art of shearing metal that the movable blade 30 will be inclined relative to the fixed blade 22 such that the cutting action between the two blades takes place at a theoretical point which moves horizontally along the cutting edge of the fixed blade 22 as the movable blade 30 moves downwardly past the fixed blade. This relationship, of course, concentrates the force of the cutting action at a point which moves along the material to be cut.

In the illustrative embodiment, plates 36 and 38 are mounted upon the support block 30 at the lower portion thereof by means such as the illustrated screws 40. It will be appreciated that the block 34 and plates 36, 38 may be integrally formed by casting or welding processes. For that reason, the whole structure comprising the block 34 and plates 36, 38 may be considered a blade-support block. The blade support block 34 is supported by bearing blocks 42 such that the block 34 is pivotally movable about a horizontally extending axis generally parallel to the cutting edge of the fixed blade 22. Then, I provide brackets 46, 48 mounted respectively on the side plates 14, 16 for pivotal movement about a trunnion 50, the axis of which is horizontally extending and generally parallel, for instance, to the cutting edge of the fixed blade 22. I provide roller means indicated generally at 54 journal mounted upon the brackets 46, 48 for rotation about a horizontally extending axis generally parallel to the axis of the trunnion 50. The roller means 54 may include a hardened steel roller 58 mounted upon a trunnion 60 extending between the brackets 46, 48. I use a spring or springs 64 yieldably to urge the plate 38 against the roller means 54, the illustrative spring 64 being connected between a connection point 66 on the plate 36 and a connection point 68 on the frame. Thus, as the block 34 and plate 38 move upwardly and downwardly, the path of movement will be controlled by the position of the roller means 54 against which the plate 38 is held by the spring 64. The journal axis of the roller means 54 is selectively adjustably positioned by positioning the brackets 46, 48 about the trunnion 50. In the illustrative embodiment, this is accomplished by having each bracket 46, 48 formed to include a forwardly projecting adjustment portion 70 which is threadedly engaged by upper and lower adjustment screws 72, 74 cooperating with upper and lower adjustment blocks 76, 78 securely mounted to the shear frame.

Thus, the distance between the cutting edge of the fixed blade 22 and the cutting edge of the movable blade 30 is selectively adjustably determined by positioning the roller means 54 against which the plate 38 is held. By moving the adjustment portions 70 downwardly, the axis of the roller means 54 is moved rearwardly relative to the fixed blade 22 to widen the space between the cutting edge of the fixed blade and the cutting edge of the movable blade.

My shear 10 may include one or two or even more power cylinders for moving the movable blade, the illustrative shear having two such hydraulic power cylinders 82, each of which provides an upwardly extending ram 84 as a driver. Each side plate 14, 16 carries a bracket 86 and the adjacent power cylinder is pivotally mounted on that bracket as indicated at 88. Then, in order drivingly to connect the power cylinders 82 to the movable blade 30, I provide a lever means or a lever frame mounted upon the upper portions of the side plates 14, 16 for pivotal movement about a horizontally extending axis generally parallel to the axis of the trunnion 50. The illustrative lever frame includes side members 92, 94 which are rigidly connected together by means of a pipe section 96, gusset plates 98 and a rear pipe section 100. It will be appreciated that these members 92, 94, 96, 98, 100 may be welded or otherwise securely fastened together to provide a rigid frame having a forwardly extending lever arm portion and a rearwardly extending lever arm portion. A trunnion 106 about which the lever frame pivots is provided and bearing blocks 108, 110 are mounted upon the lever frame to pivot upon the trunnion 106 in the illustrative embodiment. I show mounting plate 112, 114, respectively upon the side plates 14, 16 for mounting and positioning the trunnion 106. It will be appreciated that a number of different techniques may be used pivotally to mount the lever frame upon the side plates 14, 16.

Figure 4:
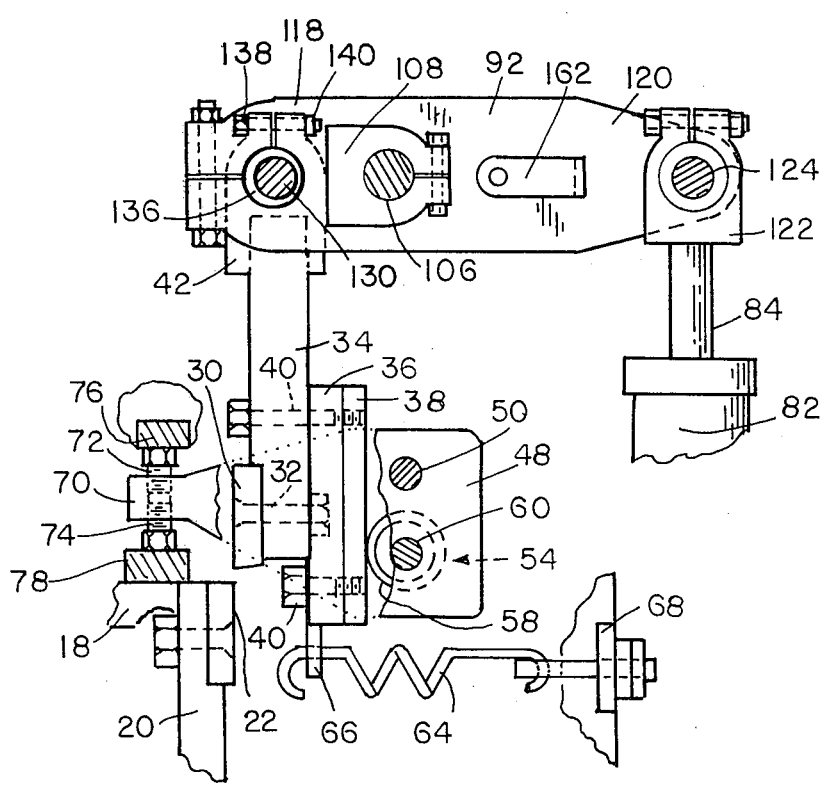
FIG. 4 is a fragmentary sectional view showing how my movable blade is guided and supported.
Figure 5:
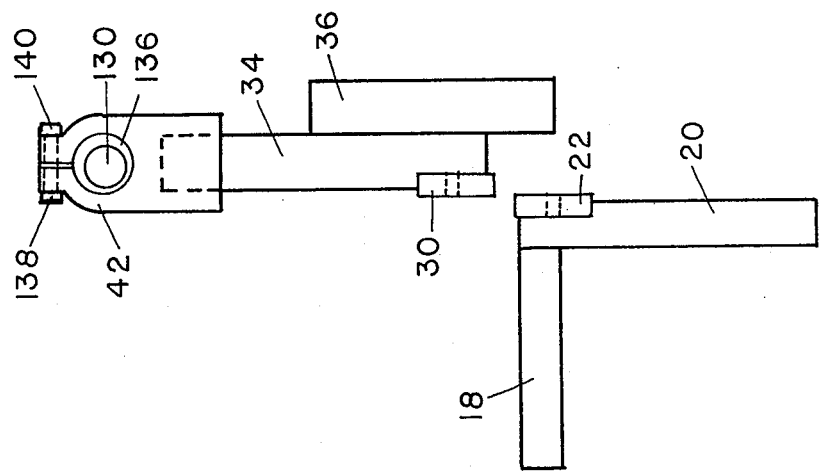
FIGS. 5 and 6 are diagrammatical views showing how the movable blade is aligned relative to the fixed blade.

In the view of FIG. 4, I designate one end or one lever arm portion of the lever frame by the reference numeral 118 and the opposite end by the reference numeral 120. Each ram 84 may be connected to the adjacent end 120 of the lever frame by means of a bearing block 122 and trunnion 124 as illustrated.

Figure 6:
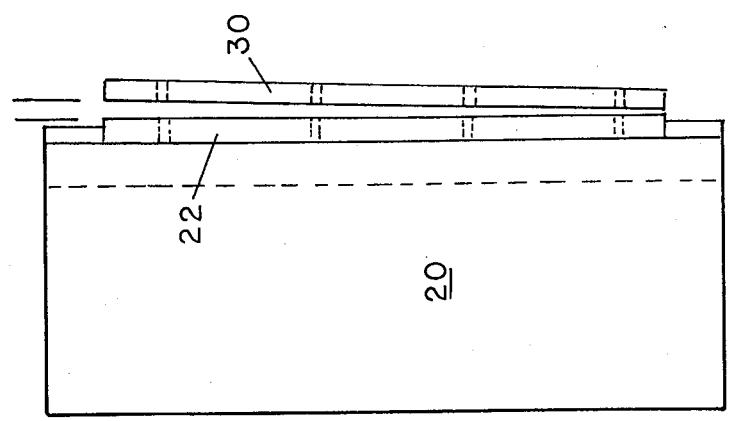

The bearing blocks 42 mentioned previously serve pivotally to connect the blade support black 34 to the forwardly extending lever arm portions 118 of the lever frame. The illustrative pivotal connection is provided by a trunnion 130 which extends between the portions 118 of the members 92, 94 and which may be secured thereon by means such as the illustrative side plates 132, 134. An eccentric sleeve 136 having internal and external cylindrical surfaces formed respectively about parallel spaced apart axes is mounted on the trunnion 130 adjacent each frame arm 92, 94. Each bearing block 42 provides a cylindrical bore which is mounted upon the external surface of the adjacent eccentric sleeve 136. This arrangement constitutes selectively adjustable means for moving the axis of the pivotal connection between the blade support block 34 and the lever frame toward and away from the pivot axis of the lever frame. The purpose of this adjustable movement is to correct the misalignment between the fixed blade 22 and the movable blade 30 caused by shifting the axis of the roller means 54. The bearing blocks 42 are conventionally split and can be loosened by loosening the illustrative bolts and nuts 138, 140 such that the eccentric sleeve 136 can be rotated about the axis of the trunnion 130. FIG. 6 shows the misalignment which would be produced by moving the axis of the roller means 54 toward the fixed blade 22. This misalignment is corrected by adjusting the eccentric sleeve 136 to move the axis of the bearing blocks 42 forwardly or away from the pivot axis of the lever frame.

Figure 7:
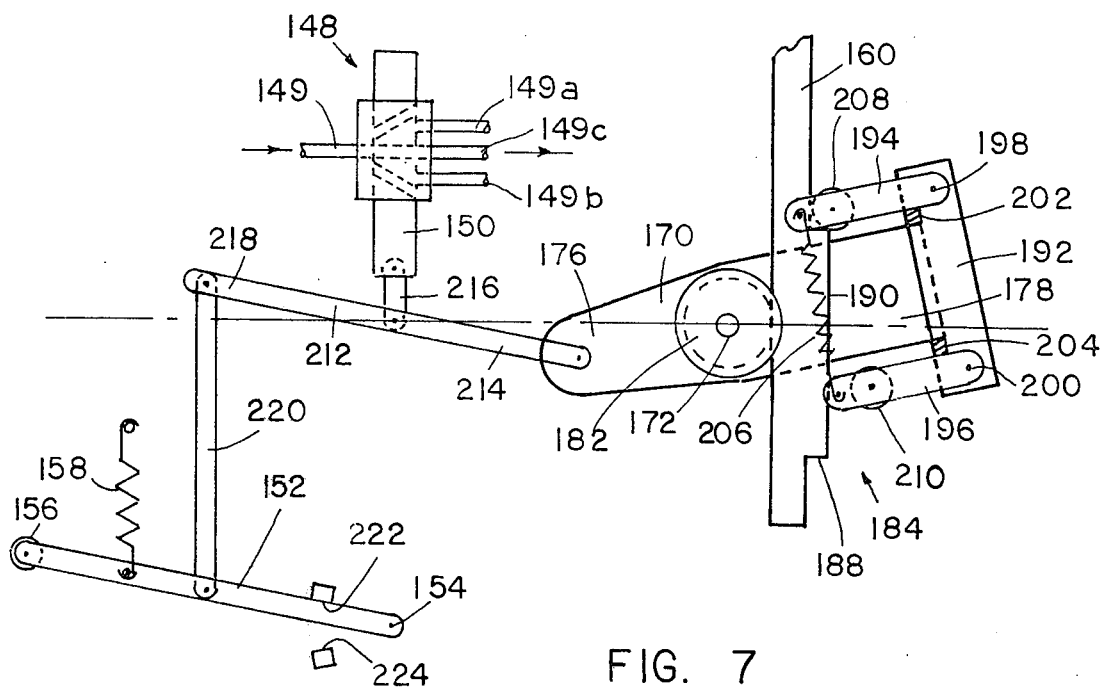
FIGS. 7, 8, 9 and 10 are diagrammatical views showing how I control the power cylinders which drive the movable blade downwardly.
Figure 8:
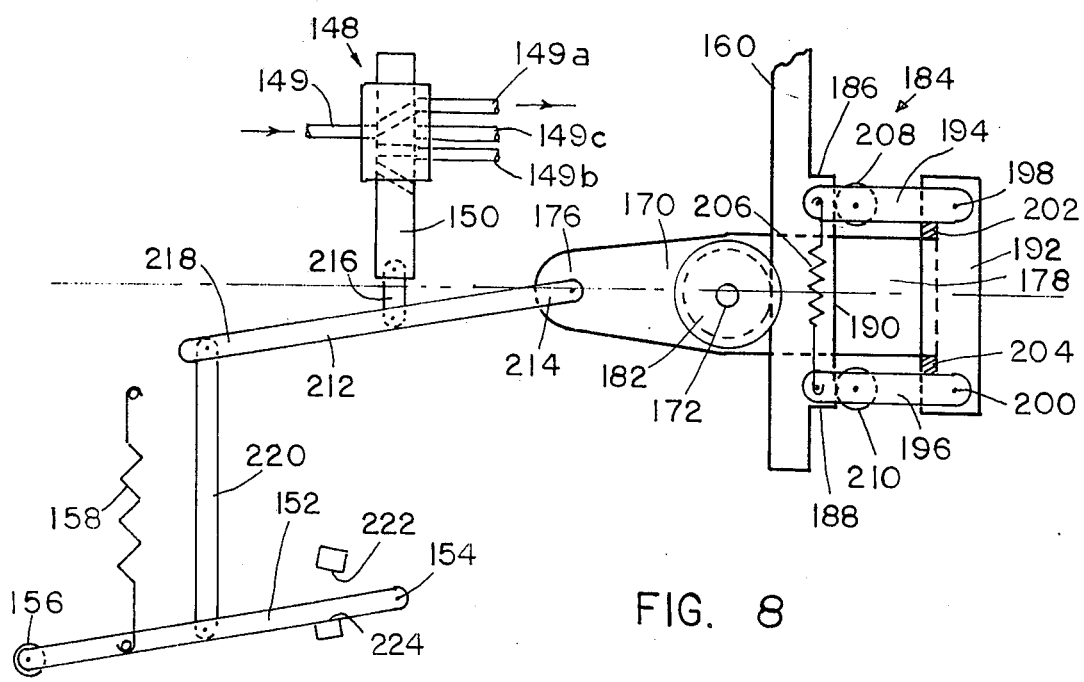
Figure 9:
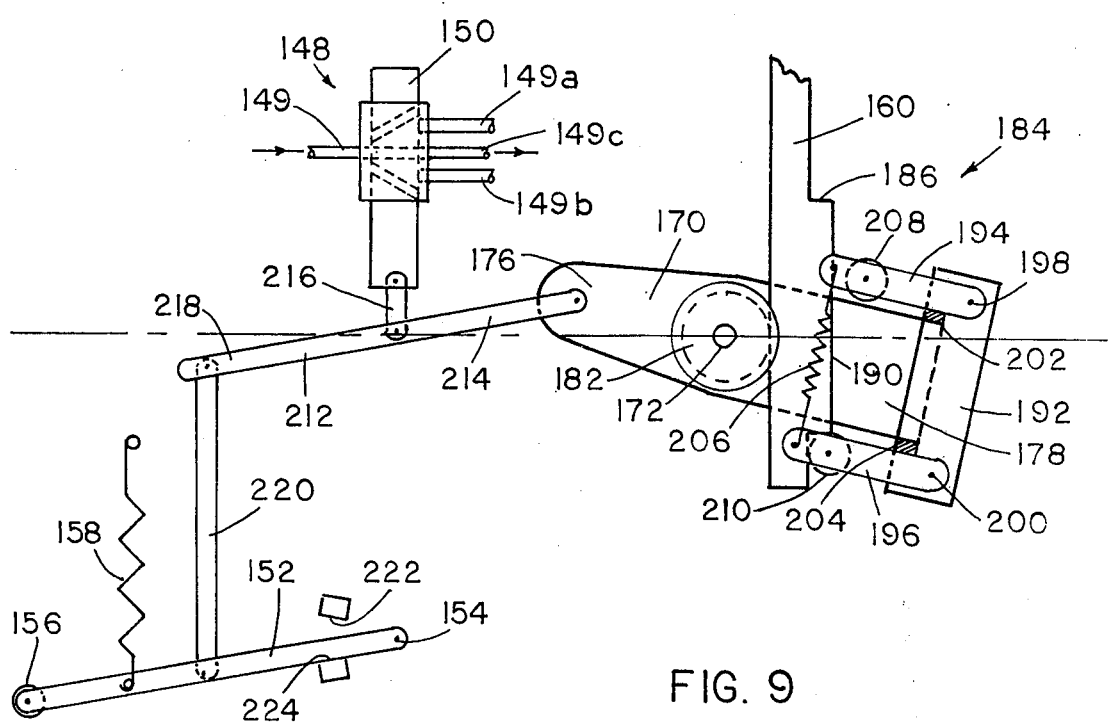
Figure 10:
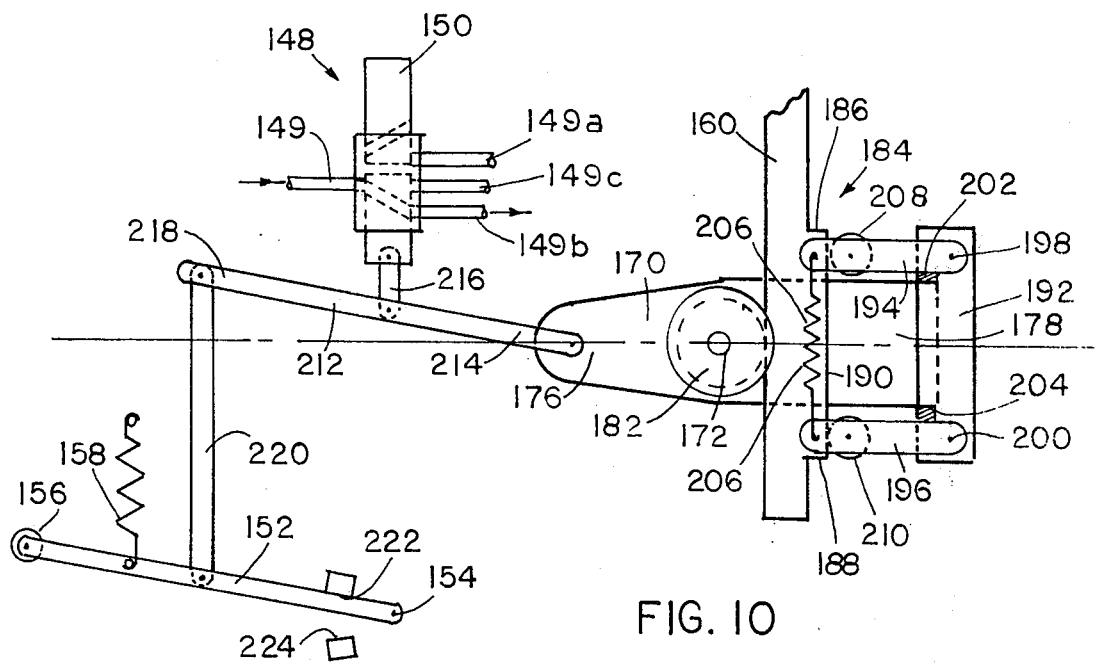

Turning now to FIGS. 1 and 7–10, it will be seen that I have illustrated a control means for the power cylinders 82 which, as indicated above, are conventional two-direction hydraulic cylinders. The control means includes a conventional hydraulic valve 148 having a movable valve member 150 having an extended position permitting fluid flow to extend the rams 84 upwardly to move the movable blade downwardly past the fixed blade, a retracted position permitting fluid flow to retract the rams, and a neutral position between the said extended and retracted position which permits circulation of the hydraulic fluid without movement of the rams 84. In FIGS. 7–10, I show the valve 148 having an input line 149 and three output lines 149a, 149b, 149c. In the neutral position, hydraulic fluid flows in the input line 149 and out the output line 149c merely to be circulated without moving the rams. The neutral position of the valve member 150 is shown in FIGS. 7 and 9. In the extended position of the valve member 150, fluid flows in the line 149 and out the line 149a to the cylinders to project the rams 84. Such a position of the valve member 150 is shown in FIG. 8. Then, in the retracted position of the valve member 150, such as shown in FIG. 10, hydraulic fluid flows into the line 149 and out through the line 149b to the power cylinders to retract the rams 84.

In the illustrative embodiment, I use a foot pedal lever 152 pivoted on the frame as indicated at 154 and providing a bar 156 which the operator of the shear can push downwardly with his foot. A spring 158 will return the lever 152 when the operator moves his foot. Then, in order to sense the position of the lever frame drivingly connecting the power cylinders to the movable blade, I provide a control rod 160 pivotally connected to a bracket 162 on the frame arm 92 as indicated at 164. This control rod 160 may be adjusted by means of a take-up device indicated generally at 166 near the fulcrum point 164. This control rod 160 cooperates with a main lever 170 pivotally mounted upon the side plate 14 for pivotal movement about a trunnion indicated at 172. The main lever 170 provides a first arm portion 176 extending generally forwardly and a second arm portion 178 extending generally rearwardly. A concentric flange 182 is mounted upon the trunnion 172 to serve as a guide for the control rod 160 confining the control rod for movement adjacent the second arm portion 178. Control rod 160 has an enlarged portion 184 providing upper and lower control surfaces 186, 188 between which extends a guide surface 190. Then a block 192 is welded or otherwise securely fastened upon the second arm portion as illustrated, and a pair of support arms 194, 196 are pivotally connected to the block 192 as indicated at 198, 200 to extend toward the enlarged portion 184. Stop blocks 202, 204 prevent the arms 194, 196 from moving toward each other. A tension spring 206 yieldably resists movement of the arms 194, 196 away from each other. Each arm 194, 196 carries a roller 208, 210 journal mounted on the distal end thereof in position to engage rollably the guide surface 190 and the control surfaces 186, 188. I provide an intermediate lever 212 having one end portion 214 pivotally connected to the first arm portion 176 of the main lever 170, its intermediate portion pivotally connected to the valve member 150 by a link indicated at 216 and its opposite end portion 218 pivotally connected to the pedal lever 152 by a link indicated at 220. The pedal lever 152 is movable between a pair of stop blocks 222, 224 as illustrated.

FIGS. 7 and 9 show the valve member 150 in neutral position with the hydraulic fluid circulating so as not to move the rams 84 in either direction. When the pedal lever 152 is pushed downwardly from its position shown in FIG. 7 to its position shown in FIG. 8, the valve member 150 moves to its extended position so that fluid flow to the hydraulic cylinders will cause the rams 84 to move upwardly. This movement of the rams upwardly will move the control rod 160 upwardly so that the roller 210 will roll off the guide surface 190 onto the control surface 188, thereby to permit the main lever 170 to pivot clockwise as shown in FIG. 9 to move the valve member 150 upwardly to its neutral position. The valve member 150 will stay in its neutral position as long as the shear operator holds the lever 152 in its lower position. When the operator releases the lever 152, the spring 158 will bring the lever 152 upwardly to raise the intermediate lever 212 to move the valve member 150 to its retracted position causing hydraulic fluid flow to retract the rams 84 which will lower the control rod 160 back to its starting position.

FIG. 7, therefore, shows the roller 208 released when the movable knife is in its uppermost position and the valve 148 is in its neutral condition permitting circulation of the hydraulic fluid without moving the rams 84. FIG. 8 shows the machine in its downstroke cycling position with the foot pedal down and the valve member 150 in its extended position to allow hydraulic fluid flow to the cylinder to project the rams 84 upwardly to bring the movable blade cycling downwardly and to lift the control bar 160 until it releases the roller 210. That releasing of the roller 210 permits the main lever 170 to swing clockwise and push the valve member 150 back into its neutral position again as shown in FIG. 9. FIG. 10 shows the mechanism in the return position.

By the linkage and lever mechanism illustrated and just described, I have provided a control system which uses a very simple and inexpensive valve 148 as the only hydraulic control valve for controlling the entire shear 10. The linkage and lever mechanism illustrated and described eliminates any expensive and complicated hydraulic control system and components such as limit switches, switch-over valves, and the like. The starting and stopping positions for the movable blade may be controlled very simply, for instance, by adjusting the control rod 160 as indicated at 166 to determine exactly when the main lever 170 will be permitted to pivot to change the position of the valve member 150.

I claim:

1. A shear comprising a frame, fixed blade means mounted on said frame, movable blade means cooperating with said fixed blade means to cut sheet material disposed therebetween, a fluid power cylinder for moving said movable blade means upwardly and downwardly past said fixed blade means, said power cylinder having an upwardly extending ram as a driver, and means for connecting said power cylinder to said movable blade means, said connecting means including lever means mounted on said frame for pivotal movement and providing oppositely extending lever portions, means for pivotally connecting said movable blade means to one of said lever portions, means for pivotally connecting said ram to the other of said lever portions, and means for controlling said power cylinder, said control means comprising a fluid valve having a movable valve control member with an extended position permitting fluid flow to extend said ram upwardly to move said movable blade means downwardly past said fixed blade means, a retracted position permitting fluid flow to retract said ram, and a neutral position between said extended and retracted positions, a main lever pivotally mounted upon said frame and providing first and second oppositely extending arm portions, a spring-returned foot pedal, an intermediate lever having one end pivotally connected to said first arm portion, an intermediate portion pivotally connected to said valve control member, and an opposite end pivotally connected to said foot pedal, means for controlling the pivotal movement of said main lever, said movement control means including a control rod pivotally connected to said other lever portion of said first named lever means, said control rod extending to intersect said second arm portion of said main lever, said control rod providing, adjacent said second arm portion, an enlarged portion having oppositely facing control surfaces transverse to the direction of extension of said control rod and, extending between said control surfaces, a guide surface, a pair of arms mounted upon said second arm portion for pivotal movement about axes parallel to the pivot axis for said main lever, each of said arms carrying, at its distal end, a roller rollably engaging said guide surface and the adjacent control surface, said rollers being effective, when both are engaging said guide surface, to prevent pivoting of said main lever, spring means for yieldably resisting separation of said arms, and stop means for preventing said arms from moving toward each other, said control rod being movable with said first named lever means relative to said second arm portion such that said main lever can pivot about its axis when one of said rollers moves from said guide surface onto one of said control surfaces.

* * * * *